Figure 5:
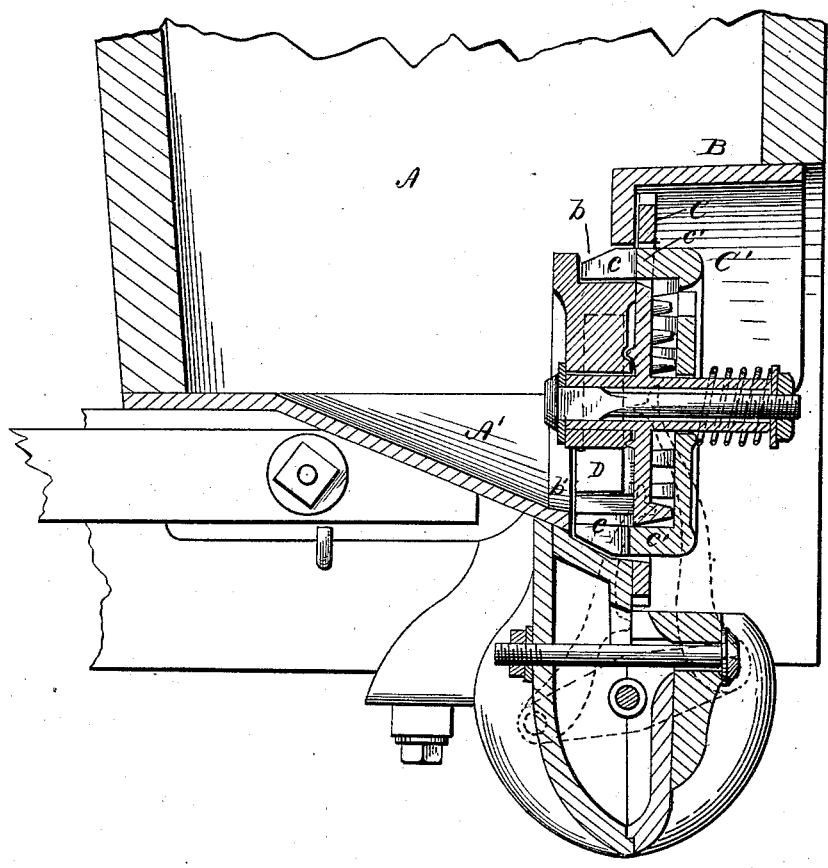

(No Model.) 2 Sheets—Sheet 1.
G. D. HAWORTH.
SEED PLANTER.
No. 283,781. Patented Aug. 28, 1883.
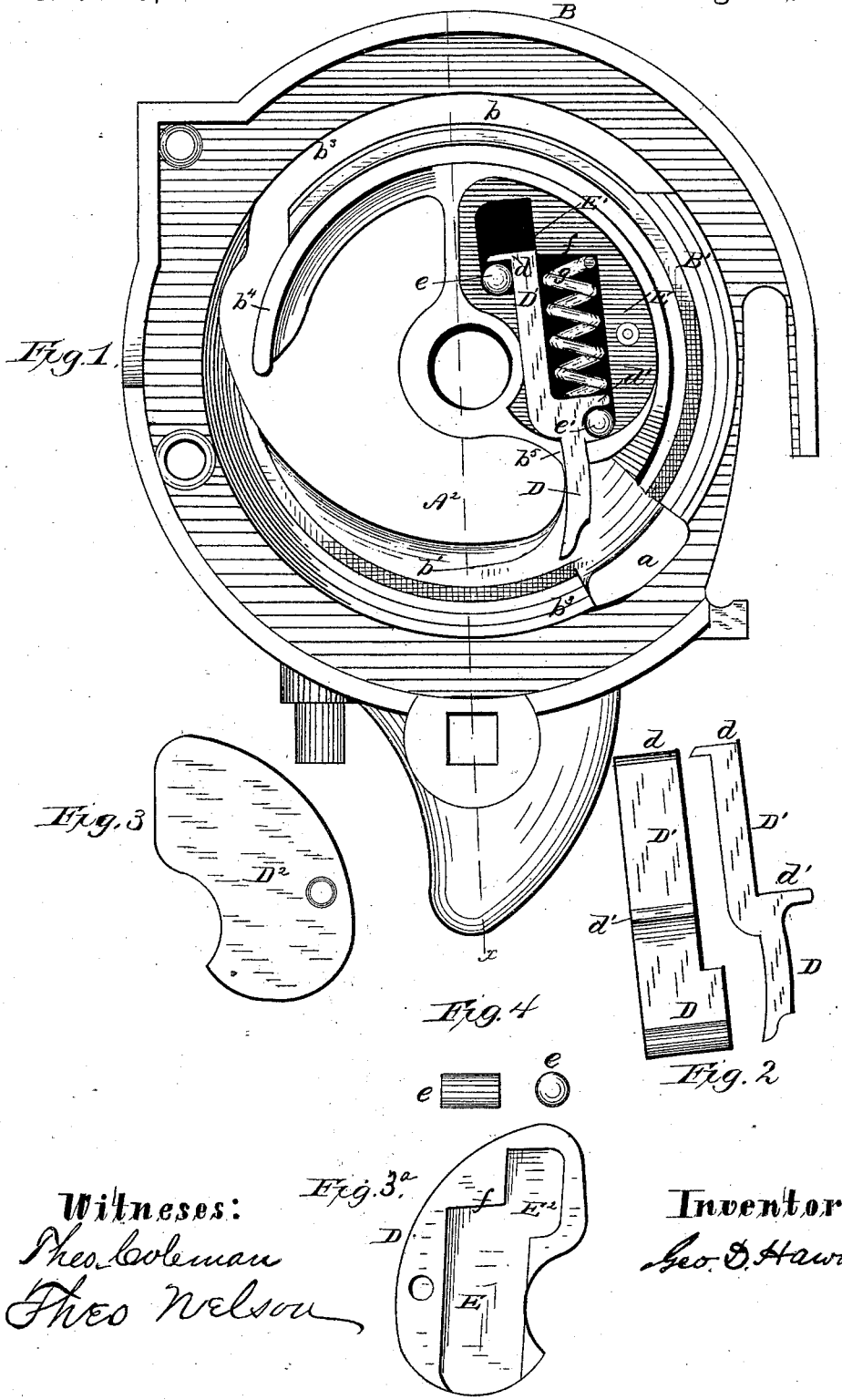
Witnesses:
Theo. Coleman
Theo Nelson
Inventor,
Geo. D. Haworth (No Model.)  G. D. HAWORTH.  2 Sheets—Sheet 2.

SEED PLANTER.

No. 283,781. Patented Aug. 28, 1883.

WITNESSES  
INVENTOR  
Geo. D. Haworth,  
by A. M. Smith,  
Attorney.

UNITED STATES PATENT OFFICE.

GEORGE D. HAWORTH, OF DECATUR, ILLINOIS.

SEED-PLANTER.

SPECIFICATION forming part of Letters Patent No. 283,781, dated August 28, 1883.

Application filed March 8, 1883. (No model.)

*To all whom it may concern:*

Be it known that I, GEORGE D. HAWORTH, of Decatur, county of Macon, and State of Illinois, have invented a new and useful Improvement in Seed-Planters, of which the following is a full, clear, and exact description, reference being had to the accompanying drawings, making part of this specification.

My invention relates to the cut-off or striker employed in connection with the feed-wheel for removing the surplus seed from the measuring cups or pockets of said wheel; and it consists in a cut-off made in the form of a yielding slide or plunger moving in a suitable socket in the shell of the feed or distributing wheel, and combined with suitable friction-rollers for giving it ease of movement, and a spring for holding it to its work with the desired pressure, as hereinafter explained.

In the accompanying drawings, Figure 1 represents a side elevation of the shell or casing of the seed-wheel with the cap-plate, covering the cut-off, removed to show the latter. Fig. 2 shows the cut-off in rear and side elevations. Figs. 3 and $3^a$ represent the removable cap-plate. Fig. 4 shows the friction-rollers detached; and Fig. 5 is a vertical section through the hopper, distributing-wheel, and shell, taken on the line $x$ $x$, Fig. 1, and showing the relation of the parts.

The arrangement of the distributing-wheel and its shell or casing relative to the hopper is similar to that described and shown in Letters Patent granted to me June 14, 1881, and said parts need not therefore be described in detail further than is necessary to an understanding of my present improvement.

A represents the seed-hopper, provided with an inclined concave bottom, A', opening at its lower side or end into the casing B of the seed-distributing wheel. The wheel is composed of the two vertical disks C and C', provided each with a circle of laterally-projecting teeth, $c$ and $c'$, the teeth of one disk passing through perforations in and between the teeth of the other disk, the extent of projection of the teeth of one disk between those of the other disk regulating the size of the measuring-cups, as explained in my former patent referred to.

Of the shell or casing B B' represent the annular groove or channel in its side, in which the teeth referred to move, a portion of said groove or channel being uncovered at $b$ and $b'$ to allow the seed to pass in and fill the measuring cups or spaces between the teeth $c$ of the disk C. As the cups are filled they are carried onward successively by the rotation of the seed-wheel to a discharge-opening, $a$, in the outer wall, $b^3$, of the channel B', and pass under a cut-off or striker, D, forming the rear wall, relatively to the movement of the wheel, of the opening $A^2$ in the channel B', through which the seed passes into the feed-wheel. This cut-off is located just in advance of the discharge-opening $a$, and serves to remove or strike off surplus seed beyond the regulated capacity of the seeding-cups. The form of this cut-off is shown in Fig. 2, its lower beveled end reaching down into close proximity with the upper inner faces of the teeth of the seeding-wheel, and its upper or shank end passing up through a slot, $b^5$, in the inner wall, $b^4$, of the channel B' into a chamber, E, formed in the shell B. The chamber E may conform to the angular shape of the shouldered or flanged shank D' of the cut-off D; or it may be enlarged, as shown, to reduce the weight of the shell or casing, and in the latter case the side walls of the chamber, of which the removable cap $D^2$ forms one, may be grooved or recessed at E' to conform to the shape and accommodate the movements of said shank end of the cut-off, and to form bearing-walls for its friction-rollers $e$ and $e'$. The shank D' is provided, just above the channel-wall $b^4$, with a rearwardly-projecting flange or lip, $d'$, which rests upon the roller $e'$, and at its upper end with a forwardly-projecting lip or flange, $d$, which rests on the roller $e$, said rollers, arranged as described, serving best to sustain the pressure of the grain or seed on the cut-off. Upon the shoulder or flange $d'$, and between said shoulder or flange and the upper wall, $f$, of the portion $E^2$ of the chamber E, is placed a spiral spring, $g$, which serves to hold the cut-off down to its work with the required pressure, while at the same time permitting it to yield upward to an obstruction or pressure which would endanger its safety or render it liable to crush or injure the seed. The rollers $e$ and $e'$, in such yielding movement of the cut-off, travel up and down on their supporting-walls, relieving the frictional resistance of and facilitating the movement of the cut-off, as described. The operation of the cut-off will be readily understood. The form of shank D' of the cut-off and of the chamber in the shell to accommodate said shank may be varied; but that shown and described has been found satisfactory in practice.

Having now described my invention, what I claim as new is—

1. The combination, with the distributing-wheel and the chambered shell or casing therefor, of the sliding cut-off or striker, and the spring for holding said cut-off to its work with a yielding pressure, substantially as described.

2. The chambered distributer-wheel casing, in combination with the yielding slide or cut-off, and the friction-rollers facilitating the movements of said cut-off, substantially as described.

3. The sliding cut-off D, provided with shoulders or projecting lips $d$ and $d'$, in combination with friction-rollers $e$ and $e'$ and the spring $g$, substantially as described.

4. The combination of the distributing or feed wheel, its chambered casing or shell B, sliding cut-off D, friction-rollers $e$ and $e'$, and spring $g$, substantially as and for the purpose described.

In testimony whereof I have hereunto set my hand this 5th day of March, A. D. 1883.

GEORGE D. HAWORTH.

Witnesses:
C. O. JUDSON,
THEO. COLEMAN.